United States Patent [19]

Bedford et al.

[11] 3,958,106

[45] May 18, 1976

[54] ARTICLE IDENTIFYING SYSTEM HAVING SCANNER FOR VERTICAL MOVEMENT IN SYNCHRONISM WITH THE ARTICLE

[75] Inventors: Norman C. Bedford, Hingham; Stanley Ronchinsky, Newton, both of Mass.

[73] Assignee: Beckwith Elevator Co., Inc., Boston, Mass.

[22] Filed: Dec. 24, 1974

[21] Appl. No.: 536,204

[52] U.S. Cl. .......................... 235/61.11 E; 214/14; 214/16 B; 250/223 R; 250/234; 212/11
[51] Int. Cl.² ............................................. G06K 7/10
[58] Field of Search .......... 235/61.11 E; 250/223 R, 250/234; 214/16.4 A, 14; 340/146.3 K

[56] References Cited
UNITED STATES PATENTS

| | | | |
|---|---|---|---|
| 3,317,714 | 5/1967 | Hausler et al. | 235/61.11 D |
| 3,402,836 | 9/1968 | Debrey et al. | 214/16.4 |
| 3,744,026 | 7/1973 | Wolff | 235/61.11 E |
| 3,746,189 | 7/1973 | Burch et al. | 214/16.4 |
| 3,784,791 | 1/1974 | Pease | 235/61.11 E |

*Primary Examiner*—Stanley M. Urynowicz, Jr.
*Attorney, Agent, or Firm*—Robert E. Ross

[57] ABSTRACT

An article identifying system especially adapted for use in identifying coded containers being transferred from one point to another by means which require that the containers be moved in a vertical direction while being moved in a horizontal direction.

A code reading scanner mounted on a vertical carrier is positioned alongside the path of movement of the article. The carrier moves vertically in synchronism with the vertical motion of the container so that at whatever level the container passes the carrier position, the scanner will be at the same level as the container.

To move the carrier vertically in synchronism with the vertical motion of the container, the motor driving the carrier is controlled by a signal generated by the vertical motion of the container. In a particular embodiment of the invention the vertical position of the container and the vertical position of the scanner carrier create voltage analogs in potentiometers, which voltages are utilized as inputs to a position servo system to drive the scanner carrier motor in the appropriate direction and/or substantially at the same speed as the container, whereby the scanner is maintained at the same elevation as the container.

13 Claims, 8 Drawing Figures

ARTICLE IDENTIFYING SYSTEM HAVING SCANNER FOR VERTICAL MOVEMENT IN SYNCHRONISM WITH THE ARTICLE

BACKGROUND OF THE INVENTION

In the handling of cargo, the use of automatic container identifying means is increasing. In a typical system, each container is provided with a coded marking or label on the surface, which marking may be identified or "read" by an optical or microwave scanner.

The coded label on the container may provide, through the scanner, data to a computer to record the receipt or shipment of the cargo, its storage location, its destination, ownership, and other data.

To be most effective, the containers should be "scanned" to identify the contents from the coded markings as they are loaded or unloaded from the transport means, which requires that the cargo handling means must carry the containers past the scanner. When containers are being loaded or unloaded from a truck or railroad car or when being taken to or from a storage warehouse, it may be convenient to insure that the containers pass by a scanner. However, in attempting to scan the containers when cargo is being for example unloaded from a ship, with the containers being lifted off the deck or out of the hold and transferred horizontally and lowered onto a truck, railroad car, or merely to a storage position, (or when being loaded with the reverse procedure occurring) it has been found difficult to insure that the container passes the scanner at the proper elevation to allow the scanner to read the coding on the container. Although it would be theoretically possible to lift the container from the ship to a predetermined level, transfer it horizontally past a scanner at the predetermined level, and then lower it onto a truck, conveyor, or to a storage position, in actual practice the crane operator starts the lateral movement of the crane mechanism as soon as the container is clear of the vessel, while still continuing a vertical motion to reduce to a minimum the time taken to transfer the container. Hence it is impossible to predict the exact height above ground that the container will be when it passes the scanner position.

SUMMARY OF THE INVENTION

In accordance with this invention, an article identifying system is provided which is particularly adapted for use with a cargo handling crane of the type having a hoist mechanism and means for moving the hoist mechanism laterally along a horizontal boom. A typical crane for ship unloading will comprise 4 supporting legs resting on a dolly system riding on a pair of rails extending along the pier or wharf, and carrying a horizontal or boom gantry which projects outwardly to extend over the cargo hatches of the ship. The crane has a hoisting motor driving a cable drum for lifting a container carrier vertically. The hoisting cables are suspended from sheaves movable along the boom by a separate traversing motor to transfer hoisted cargo laterally from the ship to the dock or vice-versa. The hoisting motor and the motor for moving the hoisting mechanism laterally may be operated simultaneously. The cargo leaving the ship is hoisted vertically out of a cargo hatch or off the deck of the vessel and then carried on an actuate path under the gantry between the crane legs to a truck, railroad car, or storage position on the pier. The exact path in either loading or unloading is determined by the relative speeds of the hoisting motor and the traversing motor, which will vary with the weight of the container being hoisted and the manner in which the individual crane operator operates the controls.

To provide means for positioning a scanner so that it will always be at the same height as the container when it passes the scanner position, the scanner is mounted on a vertically movable carrier riding on vertical tracks which may be attached to a crane leg. The vertical movement of the carrier is controlled by a carrier hoist servo motor, and the hoist servo motor is controlled by a signal generated by the crane hoist mechanism.

In the illustrated embodiment of the invention the crane hoist cable drum and the scanner carrier hoist cable drum each control the position of the tap of a potentiometer excited by a reference power supply, so that the voltage signal from one potentiometer tap is the analog of the vertical position of a container suspended from the crane hoist and the voltage signal from the other potentiometer is the analog of the position of the scanner. The signals from the two potentiometers are fed into voltage comparison means, and the voltage difference is utilized to provide a driving signal to the scanner carrier hoist motor so that the scanner matches the up and down movements of the cargo hoist. In a particular embodiment of the invention the voltage signals are fed to two inputs of an operational amplifier, the output of which is utilized as the input to a power amplifier controlling the operation of the servo motor; means is also provided for limiting the travel of the scanner at each end of the scanner carrier track, so that when the container carrier goes beyond the upper or lower limit of travel of the scanner the scanner stops at a predetermined point near the bottom or top of the track and waits until the cargo carrying mechanism passes that level on its way up or down.

For example, when the container carrier is lowered into the hold of the ship, the scanner stops automatically at some predetermined position near the bottom of its track, where it remains until the container carrier passes the level of the scanner position on its way up, at which time the scanner also starts moving upwardly to stay at the same level as the container carrier.

DESCRIPTION OF THE ILLUSTRATED EMBODIMENT

Figure 1:
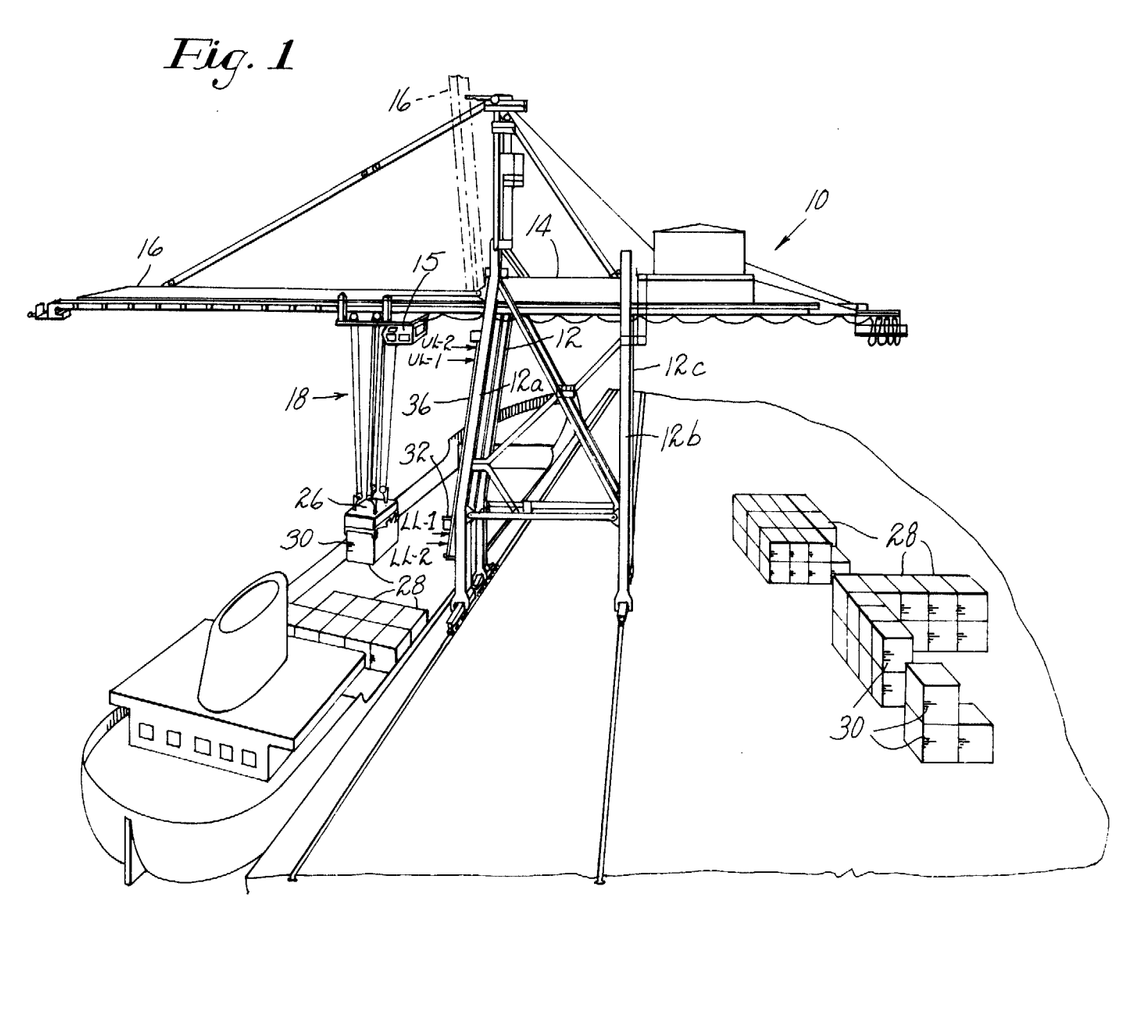
FIG. 1 is a view in elevation of a cargo handling apparatus embodying the article identifying system of the invention, illustrating a condition in which a container is being hoisted from the deck of a ship.
Figure 2:
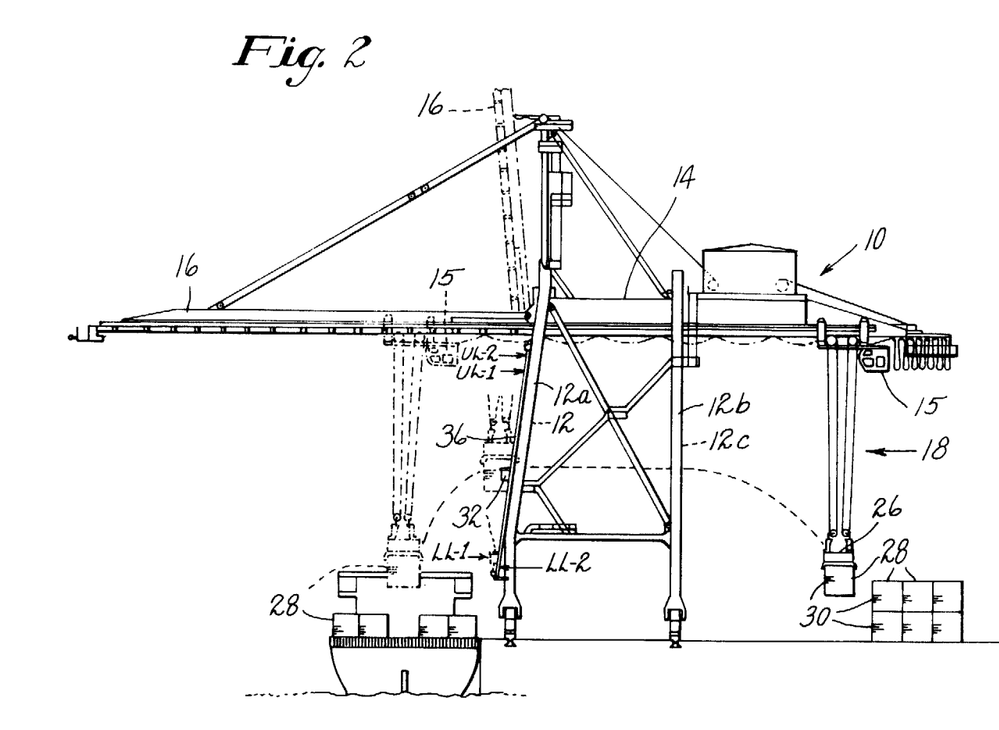
FIG. 2 is a view similar to FIG. 1 in which the container has been lifted from the ship and has been carried horizontally past the position of the scanner, with the path of the container being indicated by a dashed line.
Figure 3:
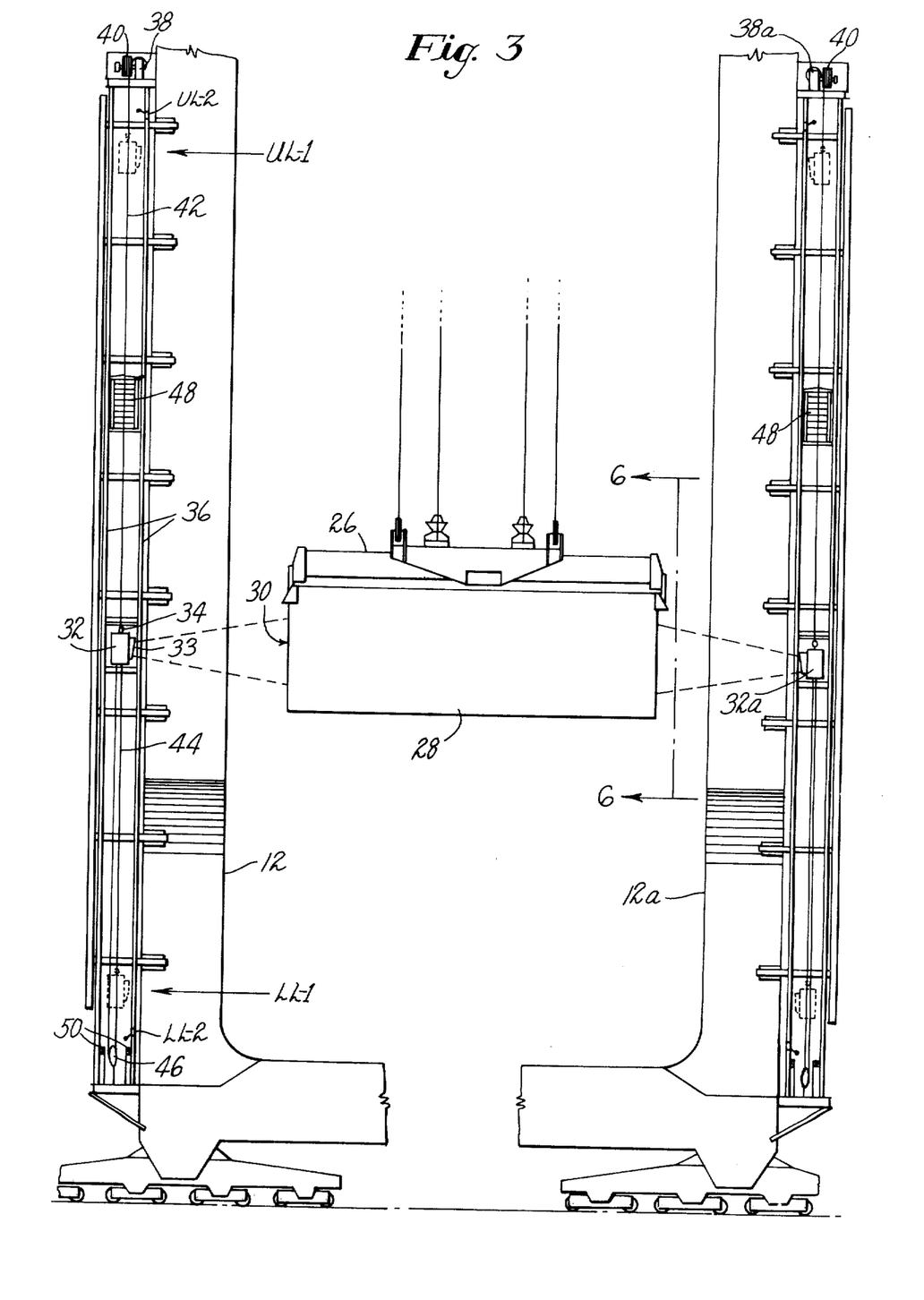
FIG. 3 is a view of a portion of the assembly of FIG. 2 as seen from the left side, in which the container is disposed between the forelegs of the crane in position for being read by the scanner.

Referring to the drawings, there is illustrated an article identifying system for use with a cargo crane 10 of the type used on a pier or wharf for loading and unloading ships. The crane 10 comprises four legs 12 supporting a gantry 14 having a boom 16 which may be lowered to extend beyond the pier over the water. The gantry and boom support a crane operator enclosure 15 which also contains cable supporting sheaves (not shown) and the enclosure is movable along the gantry and boom by a traversing motor (not shown).

In certain types of cranes a hoisting motor 22 and cable drum 24 may be disposed in the housing 15, and in other types the hoisting motor and cable drum may be at the remote end of the gantry, with only a sheave arrangement in the housing. In either case the cables depending from the enclosure support a container carrier 26.

Figures 5, 6, 7:
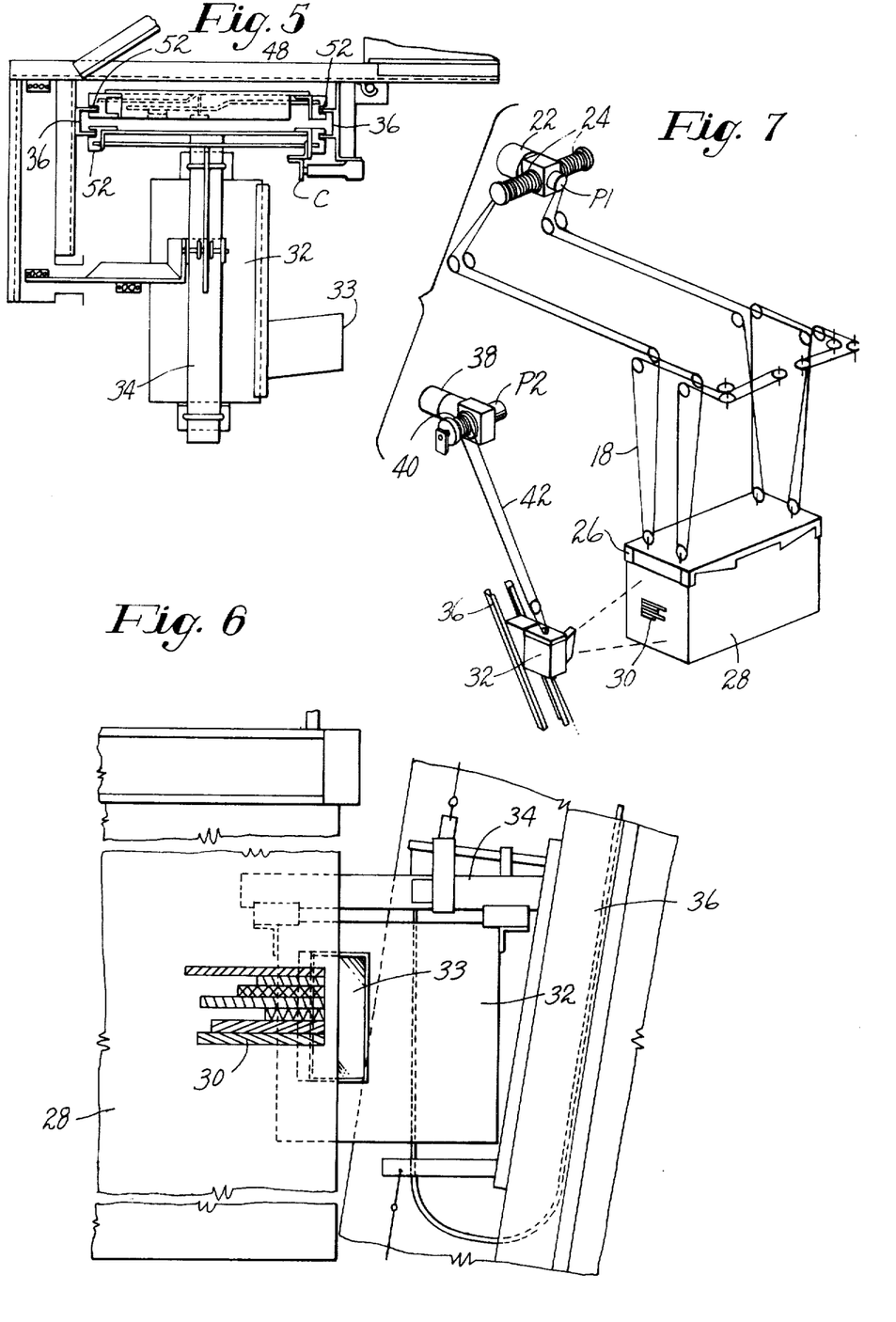
FIG. 5 is a view in section taken on line 5—5 of FIG. 4.
FIG. 6 is an enlarged view taken on line 6—6 of FIG. 3, showing the container and the identification coding on the surface thereof and the front of the scanner.
FIG. 7 is a view showing the schematic relationship between the crane hoisting mechanism container carrier and the scanner hoisting mechanism and the scanner.

To enable a container 28 to be identified automatically during loading or unloading a coded label or marking 30 is applied to the container in a predetermined position so that the coded portion may be scanned and read by suitable means while the container is being loaded or unloaded, as will appear hereinafter.

Containers that have been adopted as standard for the containerized freight system with which the herein disclosed device is to be used are 8 feet wide, 8 feet high, and either 20 feet or 40 feet long. The container carrier is designed to handle either one 40-foot container or either one or two 20-foot containers, and picks up said containers by spanning the long dimension of the container or containers, grasping the ends thereof. The container carrier 26 is suspended from the sheaves in the enclosure in an orientation such that the containers pass through the crane legs with their long axis perpendicular to the direction of travel. The coded label 30 is therefore applied to the end of the containers so that the label can be viewed by the scanner disposed alongside the path of travel of the container.

Several types of coding and scanning means are known which may be used with article identifying system to be described herein, for example, those utilizing optics or microwaves, to read the coded information on the container. The particular system used does not form part of the present invention; however, the system illustrated utilizes a label on the box which is coded by colored strips and the scanner reads the label optically when the container passes in front of the scanner or vice versa; and the information obtained by the scanner is fed to storage in digital form in a computer.

To insure that the scanner can effectively read the label, the label must pass within the field of view of the scanner, at a distance therefrom not less than 10 feet and not greater than 20 feet, and must pass through the field of view of the scanner, which in the illustrated embodiment, is an angle of about 60°.

Since it is impractical to insure that the container being loaded or unloaded will be at any predetermined height at any predetermined point in its path between the ship and the pier, it is therefore necessary to move the scanner into a position such that the container label will pass through its field of view.

Figure 4:
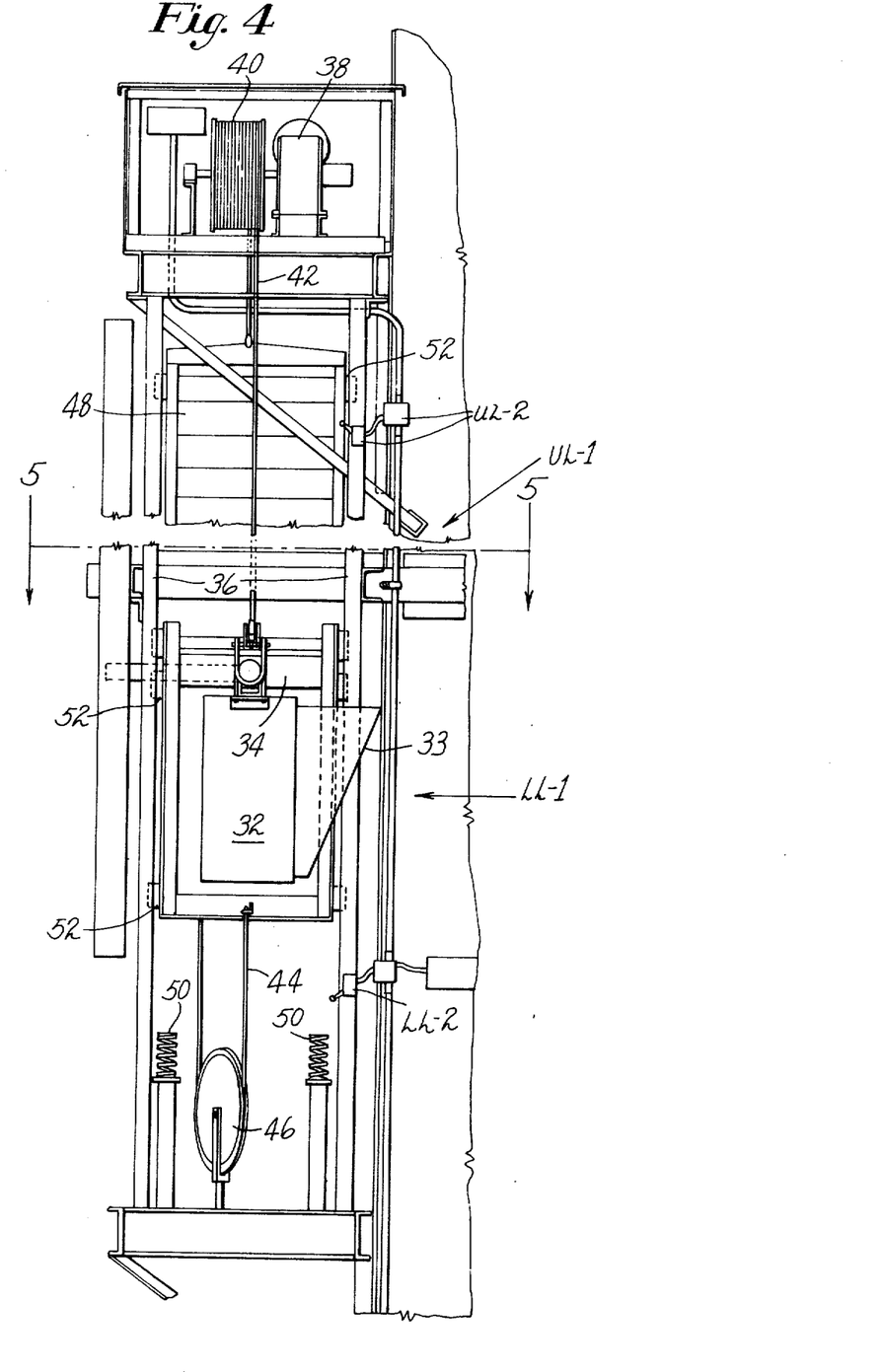
FIG. 4 is an enlarged view taken on line 4—4 of the left crane leg of FIG. 3, illustrating the scanner hoist mechanism attached to said leg.

For this purpose a scanner 32 having a viewing port 33 is mounted on a carrier 34 which is movable vertically on track formed by guide rails 36. Although the tracks may be in any position along the longitudinal path of the container, it has been found convenient to attach it to a leg 12 of the crane nearest the ship.

The scanner carrier 34 is moved vertically on the rails 36 by means of a hoist unit 38 driving a cable drum 40 mounted on a platform at a suitable height above ground, the hoist cable 42 being attached to the carrier. The mechanical structure of the scanner carrier, and associated equipment, is in conformance with standard elevator construction practice, including a down-haul cable 44, tail sheave 46, counterweight 48 and buffer springs 50. The scanner carrier 34 is provided with suitable guide shoes 52 riding on guide rails 36 so that the direction of view of the scanner is accurately maintained during the up and down motion thereof.

The up and down motion of the scanner is made to coincide with the up and down motion of the container carrier, within the limits of travel of the scanner carrier by applying appropriate driving signals to the scanner carrier hoist motor 38 in a manner now to be described.

The crane hoisting drum 24 drives the tap T1 of a potentiometer P1 (see FIGS. 7 & 8) so that when the container carrier is at the lower limit of its travel the tap T1 is at or near one end of the potentiometer resistor R1. As the crane hoists the container, the tap T1 moves toward the other end of the resistor R1 so that when the container carrier is at the upper limit of its travel, the tap T1 is at or near the other end of the resistor R1.

Figure 8:
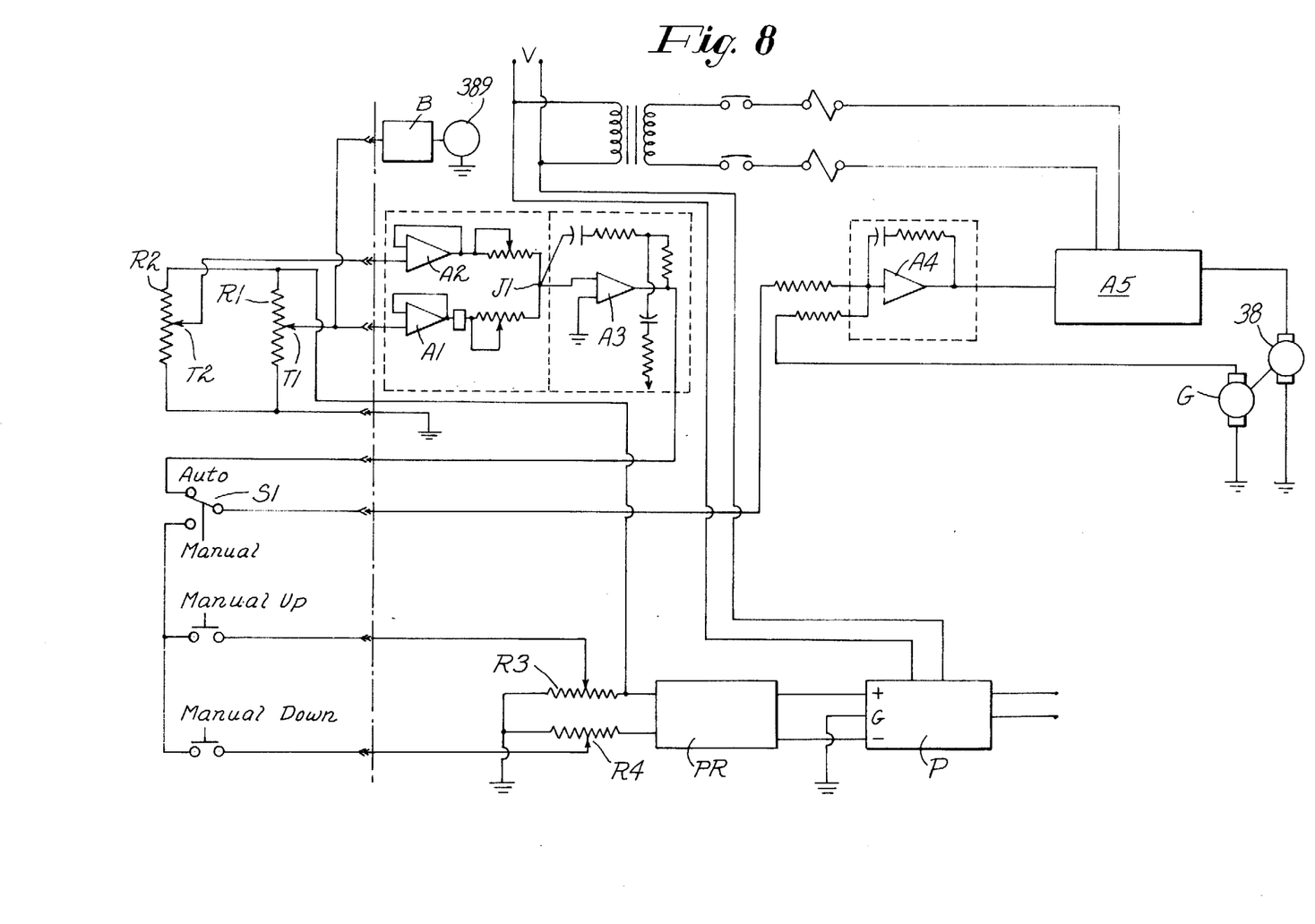
FIG. 8 is a schematic diagram of an electronic circuit for controlling the operation of the scanner hoist illustrated in FIGS. 1–6.

The tap T2 of a similar potentiometer P2 is driven by the hoist drum 40 of the scanner carrier, so that the tap T2 travels along resistor R2 with up and down movements of the scanner carrier. Since the cargo lifting device is capable of up and down movement beyond the limits of movement of the scanner carrier, the tap T2 will not travel to the ends of the resistor R2 but will operate in a medial position thereof, as will appear hereinafter.

The potentiometers, shown only schematically in the drawings, may be physically located at the cable drums and driven thereby in any suitable manner, such as by a gear reduction unit of a ratio such that the full vertical movement of the scanner and the container carrier causes the taps of the potentiometer associated therewith to move over substantially the full range of the potentiometer resistance.

Referring to FIG. 8, there is illustrated a schematic diagram of an electrical circuit for controlling the operation of the scanner carrier servo hoist motor.

A power supply P provides power to a precision reference power supply PR which supplies a constant voltage across the resistors R1 and R2 of the two potentiometers; the voltage appearing at taps T1 and T2 will therefore be an electrical analog of the position of the scanner and the container.

As illustrated in FIG. 8, the voltages at taps T1 and T2 are fed into high input impedence buffer amplifiers A1 and A2, respectively, which have unity gain, with the output thereof being connected at J1 so that the algebraic sum thereof provides the input to a third amplifier A3. The output of amplifier A3 produces a position signal of the magnitude of which is a function of the difference in height between the scanner and the container and the polarity of which is dependent on whether the scanner is above or below the container. On installation of the system, the potentiometers will be so adjusted that the voltages from the taps are equal when the coded label on a container suspended from the crane hoisting mechanism is at the same level as the scanner viewing lens.

The signal from amplifier A3 is fed, through a selector switch S1 and a velocity control loop amplifier A4 to a power amplifier A5, the output of which drives the scanner carrier servo hoist motor 38. The motor 38 also drives a tachometer G, which generates a voltage which is a function of the speed of rotation of the motor. The voltage output of the tachometer is fed back to the input of the velocity loop amplifier as negative feedback to control the speed of operation of the servo hoist motor. The use of a voltage generating device attached to a motor to create feedback to control the speed of the motor is well known in the art, and does not, per se, form part of present invention.

In operation of the system, assuming that the system is in the automatic mode and that the container carrier and scanner are stationary in the vertical plane (although the container carrier may be moving horizontally), the energizing of the crane hoist motor to lower the container will cause the tap T1 of the crane hoist motor potentiometer to move toward the negative end of the resistor. A negative voltage thereby appears at the Junction J1 (amplifier A3 input) which causes the output of amplifier A3 to signal the power amplifier to drive the servo motor 38 in a direction that will both lower the scanner and move the tap T2 of the scanner potentiometer toward the negative end of the resistor R2, which will tend to balance the voltage at J1. The speed of the motor 38 is a function of the output voltage of amplifier A3 and therefore a greater separation between the height of the scanner and the height of the container will cause an increase in driving speed of the motor 38, within the limits allowed by the negative feedback to the velocity loop from the tachometer G. However, the maximum permitted speed of the scanner hoist motor is great enough to allow it to follow the motion of the container carrier when it is being hoisted or lowered at the maximum speed of the crane hoist motor. Similarly, when the crane motor is energized to raise the container carrier, the tap T1 moves toward the positive end of the resistor R1, so that a positive voltage output appears at the input of amplifier A3, and the scanner carrier motor 38 is driven in a direction such that the scanner is raised and the tap T2 moves toward the positive end of resistor R2.

The scanner therefore follows the up and down motion of the container (within the limits of travel of the scanner) whatever the position of the container hoist mechanism on the boom or gantry.

Hence when a container is lifted from the ship and then carried along the boom toward the pier while still being lifted, the scanner is also moving upwardly on its track, to remain at the same level as the container. Hence when the container passes the leg of the crane carrying the scanner, the scanner viewing port 33 is at the same level as the coded label 30 on the container, so that the label is read as the container passes the scanner and the information transmitted by the scanner is fed into the information storage or decoding means.

The limits of travel of the scanner carrier on the track during normal operation are determined by electrical means to be described, so as to limit the motion of the scanner to the portion of the track 36 between an upper electrical limit UL1 and a lower electrical limit LL1 (see FIGS. 3 & 4). In case of failure of the electrical limits, cam operated limit switches UL 2 and LL 2 are provided above and below the position of U 21 and LL 1 respectively, said limit switches being operable by a cam C on the scanner carrier. When operated by cam C, either limit switch UL 2 or LL 2 will operate to break the power circuit to the servo hoist motor in any convenient manner. Other back-up limit switches may be provided, if desired, in conformance with standard electric practice.

The electrical limits UL 1 and LL 1 are established at a position such that during normal loading or unloading operations the coded label on the container will pass the position of scanner track at a height such that it will be somewhere between these two limits. The container carrier must often come from or go to a position outside these limits, such as when it is lowered into the hold of a ship. Provision must therefore be made for stopping the scanner carrier at the LL 1 position when the container carrier goes below this position in such a manner that when the container carrier again passes this position on the way up, the scanner carrier will start moving upwardly at the same rate as that of the container carrier.

One manner in which this may be accomplished is to limit the output voltage from amplifier A1 that may be produced by the movement of the crane potentiometer tap T1. In the illustrated embodiment, this is accomplished by providing a voltage limiter L at the output of the amplifier A1. In a particular embodiment of the invention, if the reference voltage limiter may be designed to limit the voltage output of amplifier A1 to a maximum of 17.5 volts and a minimum of 2.5 volts.

Hence when the container carrier is lowered past the level of the lower limit position of the scanner, although the voltage applied to the amplifier A1 by the tap T1 continues to decrease, the voltage output amplifier A1 is maintained at 2.5 volts by the voltage limiter L. Hence the scanner carrier, moving down at the same rate as the container, reaches a level such that the position of tap T2 is producing a voltage of 2.5 volts at the output, the net voltage at J2 will be zero and there will be no further movement of the scanner carrier.

When the crane hoisting motor thereafter raises the container carrier to a point such that the voltage from the tap T1 becomes great enough to cause the output voltage from amplifier A1 to exceed 2.5 volts, the unbalanced voltage resulting at J1 will effect energizing of the scanner carrier hoist motor to cause the scanner carrier to follow the movement of the container carrier.

An analogous effect occurs if the container carrier passes above point UL1, in which case the voltage limiter L will not allow the output voltage of amplifier A1 to exceed 17.5 volts.

Although coded labels are applied to each end of the container it is possible that one of the labels will be defaced or missing. Hence to insure that each container will be read, a second scanner 32b may be provided on the other foreleg 12b of the crane. The scanner 32b is driven by a servo motor 38a identical to servo motor 38. To provide for redundancy in the system, all of the components of the system, including the power supply, scanner, potentiometer, amplifiers, velocity control, power amplifiers and limit switches (indicated on FIG. 8 schematically as Box B) are duplicated for the control of scanner 32b. The voltage from the tap T1 of the crane potentiometer is, however, used as the position reference voltage for both scanners.

In the event that two 20-foot containers are being carried, the provision of the second scanner will enable both container labels to be read as the containers pass between the crane legs.

In the illustrated embodiment of the invention, the servo position loop utilizes variable resistance as the position controlling means; however it would also be possible to use variable inductances or variable capacitances to achieve the same purpose. The servo control system may, in some cases comprise in place of the electrical circuits illustrated, pneumatic, hydraulic, or fluidic controls, or combinations thereof.

Although the specific form of crane illustrated utilizes an electric motor as the hoist power, other forms of power, such as internal combustion engines or hydraulic motors could be used. The potentiometer P1 may be driven by means other than the cable drum if desired, such as by the hoist motor or by a wheel riding on the hoist cable.

Since certain other changes obvious to one skilled in the art may be made in the illustrated embodiment of the invention without departing from the scope thereof, it is intended that all matter contained herein be interpreted in an illustrative and not a limiting sense.

I claim:

1. An article identification system for use with a materials handling system in which articles are moved from one position to another by means which changes the elevation of the article while transferring it in a horizontal direction, said system comprising means for identifying the article when the article and identifying means are within a predetermined distance from each other, means for moving said identifying means along a predetermined vertical path between upper and lower levels between which levels the article will be when it passes said path, and means controlling the vertical movement of the identifying means so that it moves in a vertical direction simultaneously with the vertical movement of the article.

2. In a materials handling system in which articles are lifted from one position and transferred horizontally to another position, said system including hoisting means, said articles having coded indicia to indicate contents, destination, ownership, or other information, and a scanner is provided for reading said indicia when the article passes through the field of view of the scanner, the improvement comprising means for moving said scanner vertically simultaneously with the article and at substantially the same rate over at least a portion of the vertical distance travelled by the article, and control means responsive to the movement of the hoisting means to control the means for moving the scanner vertically.

3. A system as set out in claim 2 in which said control means comprises means associated with the article hoisting means and the scanner hoisting means for creating an analog in electrical units of the vertical position of the article and the scanner respectively and means comparing said electrical units to create a driving signal to the scanner motor to cause it to move in a direction to tend to equalize said electrical units and to move the scanner toward the elevation of the article.

4. A system as set out in claim 3 in which means is provided for limiting the output of electrical units from the means associated with the article hoisting means to less than the output of electrical units that would otherwise result from the total possible vertical excursion of the article hoisting means whereby the vertical excursion of the scanner is limited to less than the total possible vertical excursion of the article.

5. A system as set out in claim 3 in which said means for creating an electrical analog comprises a first potentiometer having a tap whose position is controlled by the vertical position of the article and a second potentiometer whose tap position is controlled by the position of the scanner, means applying a voltage across the potentiometer whereby the voltage at the tap of the first potentiometer varies with the position of the article and the voltage at the second tap varies with the position of the scanner.

6. A system as set out in claim 5 in which means is provided for limiting the voltage from the tap on the first potentiometer that can be utilized in the means comparing the electrical units to less than the total voltage across the potentiometer, whereby the vertical excursion of the scanner is less than the possible vertical excursion of the article.

7. In a materials handling system in which containers are lifted from one position by hoisting means, and transferred along a horizontal path to another position, said containers having coded indicia and said system including a scanner for reading said indicia when it passes through the field of view of the scanner, the improvement comprising a vertical track positioned alongside the horizontal path of the container, said scanner being mounted on said track, means for moving said scanner up and down on the track, and control means responsive to the movement of the hoisting means to cause a corresponding movement of the scanner to maintain the scanner at the same elevation as the coded indicia on a container being carried by the hoisting means throughout at least a part of the up and down excursion of the hoisting means, whereby when the container passes the track, the scanner is at the same elevation as the indicia on said container.

8. A system as set forth in claim 7 in which said control means comprises means for producing a first signal which is a function of the elevation of a container carried by the hoisting means and means for producing a second signal which is a function of the vertical position of the scanner and means responsive to the difference in said signals to drive the scanner hoisting means in a direction such that the difference between the signals is lessened and the scanner is moved toward the elevation of the container.

9. A system as set forth in claim 8 in which means is provided for limiting the first signal to a value less than would otherwise be produced by the full excursion of the hoisting means, whereby the permitted excursion of the scanner is less than the full excursion of the hoisting means.

10. A system as set forth in claim 8 in which said first and second signals are produced by the tap of first and second potentiometers, the position of said taps being a function of the elevation of the coded indicia and the scanner respectively.

11. A system as set forth in claim 10 in which the difference in voltage between said taps is fed to comparison means to create a signal to drive the scanner motor in a direction such as to move the scanner toward the elevation of the coded indicia and tend to reduce the voltage between the taps, and means is provided to limit both the maximum and minimum voltage applied to the comparison means from the tap of the first potentiometer to a value less than would be produced by the full excursion of the hoisting means, whereby the excursion of the scanner is less than the full excursion of the hoisting means.

12. In a materials handling system in which articles are lifted from one position by an article carrier, and transferred to another position, said articles carrying external coded indicia, and means is provided for reading said indicia, the improvement comprising scanner means positioned alongside the path of travel of said article carrier, means causing said scanner to move along a vertical path so as to stay at a predetermined elevation in relation to the article carrier, means preventing said scanner from moving below a predetermined level even when the article carrier moves below said level, and means causing the scanner to move upwardly simultaneously with the article carrier when the article carrier moves upwardly past said level.

13. A system as set out in claim 12 in which means is provided for creating an analog in electrical units of the position of the article carrier and the scanner, means comparing said units to provide a driving signal to the scanner moving means to cause it to move in a direction that will cause the difference between said units to decrease, and means limiting the electrical units that can be produced by the position of the article carrier to less than would otherwise be produced by the movement of the article carrier over its full possible range of vertical movement, whereby the scanner is permitted to move vertically only over a portion of the total possible vertical movement of the article carrier.

* * * * *